UNITED STATES PATENT OFFICE.

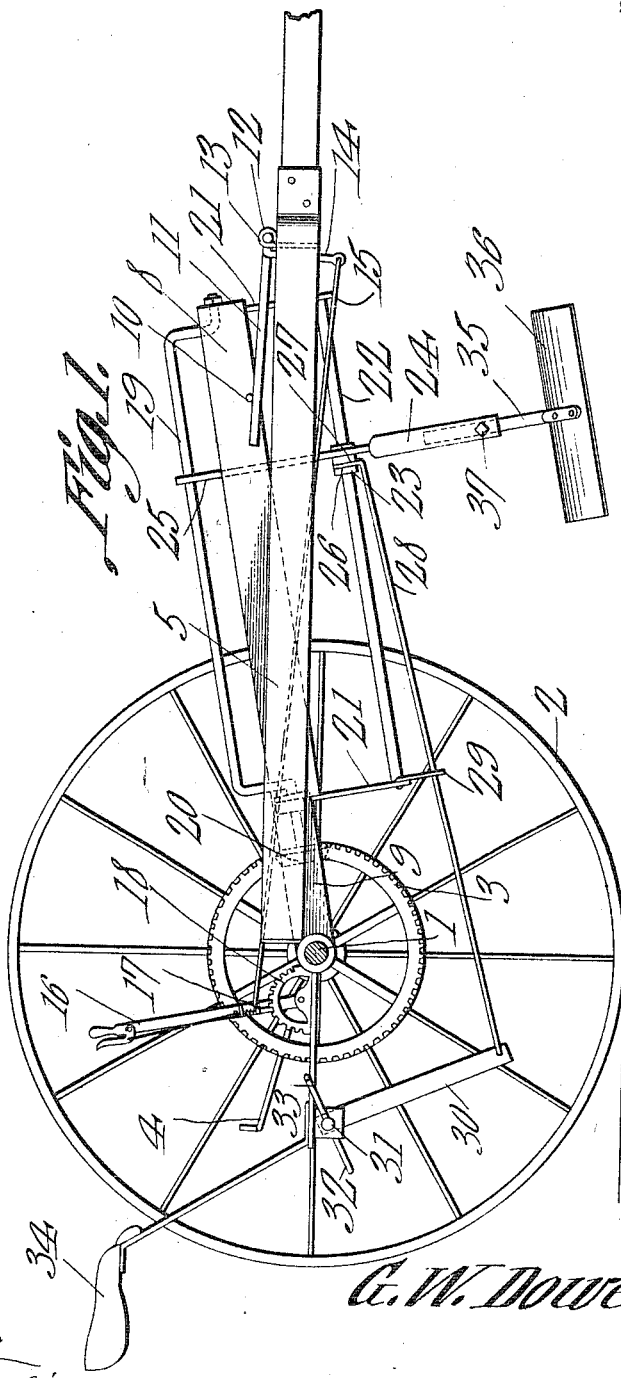

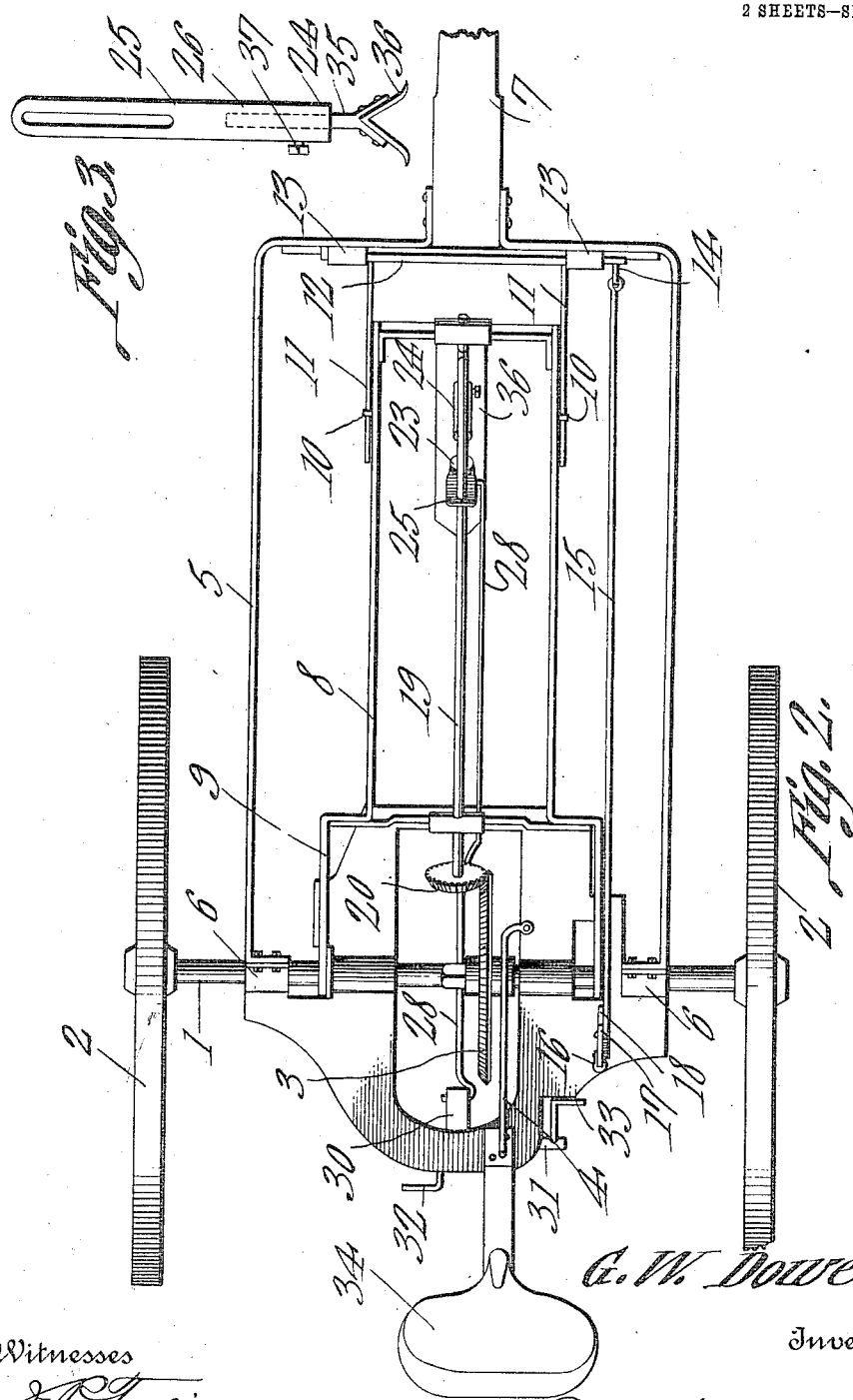

GEORGE W. DOWELL, JR., OF ATHENS, TEXAS.

COTTON-CHOPPER.

1,038,540.

Specification of Letters Patent.   Patented Sept. 17, 1912.

Application filed September 28, 1911. Serial No. 350,778.

*To all whom it may concern:*

Be it known that I, GEORGE W. DOWELL, Jr., a citizen of the United States, residing at Athens, in the county of Henderson and State of Texas, have invented a new and useful Cotton-Chopper, of which the following is a specification.

This invention relates to cotton choppers and one of its objects is to provide a machine of this character, the chopping element of which is mounted for oscillation so as to throw the cut plants and the soil to both sides of the row.

A further object is to provide means under the control of the operator whereby the chopping element can be shifted in either direction longitudinally of the machine during the actuation of said element whereby the said chopping or cutting element can be caused to act more than once upon the same plant during the forward movement of the machine.

A further object is to provide means under the control of the operator whereby the chopping element can be raised or lowered during the forward movement of the machine, it thus being possible to lower said chopping element into depressions and to raise it so as to pass over obstructions.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is a side elevation of the machine. Fig. 2 is a plan view thereof. Fig. 3 is a front elevation of the chopping hoe and its arm.

Referring to the figures by characters of reference 1 designates the axle of the machine, the same being supported by wheels 2 which are secured thereto in any suitable manner. A drive gear 3 is feathered on the axle or is held against rotation relative thereto in any other suitable manner, this gear being shiftable longitudinally of the axle by means of a lever 4 fulcrumed upon the main frame 5 of the machine. This main frame is supported adjacent one end by the axle 1, said axle being adapted to rotate within suitable bearings 6 mounted on the frame. The front end portion of the frame is connected to a tongue 7. A supplemental frame 8 is mounted within the frame 5 and has rearwardly extending arms 9 pivotally connected to the axle 1. The front end portion of this supplemental frame has laterally extending bearing projections 10 supported by elevating fingers 11. These fingers extend rearwardly from a shaft 12 journaled within suitable bearings 13 arranged upon the front portion of the main frame 5. An arm 14 extends downwardly from one end portion of the shaft 12 and is connected, as by means of a rod 15, to a lever 16 which is fulcrumed upon the rear portion of the frame 5 and is provided with any suitable means, such as a pawl 17 and a toothed segment 18, for locking the lever in any position to which it may be moved. A crank shaft 19 extends longitudinally of and is journaled within the supplemental frame 8 and a gear 20 is secured to the rear end portion of the spring shaft and is adapted to mesh with the gear 3 hereinbefore referred to.

Hangers 21 extend downwardly from the front and rear end portions of the supplemental frame 8 and support a guide rod 22 which is parallel with the axis of rotation of the shaft 19. A sleeve 23 is mounted to slide and rotate upon the guide rod 22 and has a tubular stem 24 extending downwardly therefrom, while a longitudinally slotted arm 25 extends upwardly from the sleeve. An annular groove 27 is formed in the rear end portion of the sleeve 25 and is engaged by a band 27 formed at the front end of the connecting rod 28. This connecting rod is mounted within a guide 29 extending downwardly from the rear hanger 21, the rear end of the rod being pivotally connected to the lower end of an arm 30. This arm is fixedly connected to and extended downwardly from a shaft 31 journaled upon the rear portion of the main frame 5 and foot pieces or treadles 32 extend rearwardly and forwardly respectively from the shaft 31 at points where they can be readily operated by the feet of a person occupying a seat 34 supported above the rear portion of the main frame 5. Levers 4 and 16 can also be easily reached by the occupant of the seat 34.

The tubular arm 24 is adapted to receive a stem 35 extending from the ridge of an inverted V-shaped hoe 36 the longitudinal edges of which are outturned as indicated clearly in Fig. 3. Any suitable means, such as the set screw 37, may be provided for securing stem 25 within the arm 24 and it will be apparent that the hoe 36 and its stem can be easily removed and another one, either larger or smaller, can be substituted therefor.

It is to be understood that when the machine is drawn forward the chopping mechanism will not operate unless gear 3 is in mesh with gear 20. Should these two gears be in mesh, gear 20 will rotate the crank shaft 19 and the same will work within the slot in arm 25 and cause said arm and the arm 24 to oscillate. A corresponding movement will be imparted to the hoe 36, which, as it travels along the row of plants will throw the plants and soil first to the right and then to the left. By pressing downwardly on the treadle 33, the operator can pull the sleeve 23 rearwardly and cause the hoe 36 to likewise move rearwardly. Depression of treadle 32 will cause the hoe to be shifted forwardly. Thus it will be seen that the hoe can be shifted longitudinally of the machine so as to strike a plant one or more times during the forward movement of the machine and to avoid hitting plants which would otherwise be removed. By manipulating lever 16, shaft 12 and fingers 11 can be actuated and the fingers will either push upwardly on the bearing projections 10 and thus swing the supplemental frame 8 upwardly, or will swing downwardly and permit said supplemental frame to lower. Thus it will be seen that the hoe can be raised or lowered whenever desired and will operate as efficiently upon uneven ground as along a level surface. Moreover by elevating the supplemental frame, the hoe can be raised over obstructions in the path thereof. By removing hoe 36 and its stem 35 from arm 24 another larger or smaller hoe can be substituted.

What is claimed is:—

1. A cotton chopper including a guide rod, an element mounted for oscillation thereon, a hoe connected to one end portion of said element, a crank shaft mounted for rotation and engaging the other end portion of said element to oscillate the same, and means for sliding said element along the rod and crank shaft during the oscillation of the element.

2. A cotton chopper including a main frame, a supplemental frame mounted for swinging movement therein, means for raising and lowering the supplemental frame relative to the main frame, a crank shaft extending longitudinally of and journaled within the supplemental frame, a guide rod parallel therewith, a hoe carrying element mounted for sliding movement upon the rod and crank shaft, said element having a slot in which the crank shaft is adapted to work, means for rotating the crank shaft to oscillate the hoe carrying element, and means for shifting said element longitudinally of the rod and shaft in either direction.

3. A cotton chopper including a wheel supported drive axle, a main frame supported at one end thereby, a supplemental frame mounted to swing relative to the axle, a lifting element fulcrumed upon the main frame means under the control of the operator for shifting said element upwardly or downwardly, a bearing projection upon the supplemental frame, and supported by the lifting element, a guide rod extending longitudinally of the supplemental frame, a crank shaft journaled within the supplemental frame, coöperating means upon the crank shaft and axle for actuating the crank shaft, a hoe carrying element mounted to slide and rotate upon the guide rod and having a slotted end portion engaged by the crank shaft, and means under the control of the operator for shifting said element longitudinally in either direction along the rod and crank shaft.

In testimony that I claim the foregoing as my own, I have hereto affixed my signature in the presence of two witnesses.

GEORGE W. DOWELL, Jr.

Witnesses:
J. B. GAUNTT,
WILLIE PRATHER.